United States Patent [19]
Uno et al.

[11] Patent Number: 5,493,161
[45] Date of Patent: Feb. 20, 1996

[54] SEALED MAGNETIC FLUID BEARING FOR POLYGON MIRROR DRIVE MOTOR

[75] Inventors: Satosi Uno; Sueo Akashi; Katsutoshi Nii, all of Hitachi; Kazuhiko Kawaike, Katsuta; Hiroo Hiroyama; Kosho Ishizaki, both of Hitachi, all of Japan

[73] Assignee: Hitachi, Ltd., Tokyo, Japan

[21] Appl. No.: 186,166

[22] Filed: Jan. 25, 1994

Related U.S. Application Data

[63] Continuation of Ser. No. 692,662, Apr. 29, 1991, Pat. No. 5,325,006.

[30] Foreign Application Priority Data

| Apr. 27, 1990 | [JP] | Japan | 2-110065 |
| May 9, 1990 | [JP] | Japan | 2-117614 |
| Oct. 11, 1990 | [JP] | Japan | 2-270408 |

[51] Int. Cl.$^6$ ............... H02K 21/12; H02K 15/03; H02K 7/14; H02K 7/08
[52] U.S. Cl. ............... 310/156; 310/42; 310/90; 310/67 R
[58] Field of Search ............... 310/42, 67 R, 310/90, 90.5, 156, 268; 384/100, 107; 29/525, DIG. 35; 310/156, 42, 67 R, 90, 90.5, 268

[56] References Cited

U.S. PATENT DOCUMENTS

| 2,767,339 | 9/1950 | Hatfield | 310/261 |
|---|---|---|---|
| 4,250,423 | 2/1981 | Linscott, Jr. | 310/258 |
| 4,523,800 | 6/1985 | Yamashita et al. | 310/90 |
| 4,585,967 | 4/1986 | Mayer et al. | 310/217 |
| 4,607,182 | 8/1986 | Ballhaus | 310/67 R |
| 4,694,213 | 9/1987 | Gowda et al. | 310/90.5 |
| 4,805,972 | 2/1989 | Tanaka et al. | 310/90 |
| 4,866,324 | 9/1989 | Yuzawa et al. | 310/268 |
| 4,905,110 | 2/1990 | Krum et al. | 310/99.08 |
| 4,916,346 | 4/1990 | Kliman | 310/261 |
| 4,938,611 | 7/1990 | Nii et al. | 384/107 |
| 4,958,098 | 9/1990 | Sarraf | 310/268 |
| 5,045,738 | 9/1991 | Hishida et al. | 310/261 |
| 5,047,677 | 9/1991 | Mineta et al. | 310/67 R |
| 5,095,238 | 3/1992 | Suzuki et al. | 310/156 |
| 5,103,335 | 4/1992 | Sugiura | 310/90 |
| 5,142,180 | 8/1992 | Moore et al. | 310/90 |
| 5,158,390 | 10/1992 | Ito et al. | 29/525 |

FOREIGN PATENT DOCUMENTS 61-157820 7/1986 Japan.

*Primary Examiner*—Clayton E. LaBalle
*Attorney, Agent, or Firm*—Antonelli, Terry, Stout & Kraus

[57] ABSTRACT

A motor provided with a magnetic fluid bearing device for suppressing vibration and irregular rotation as well as preventing the magnetic fluid from being scattered from a bearing portion and the inside of the motor. The motor includes a rotor having a polygon mirror mounted thereon, a stator unit having driving coils, a rotor position detector and a rotor revolution detector attached thereto, a magnetic fluid bearing unit having a magnetic seal and a dynamic pressure seal attached thereto and a magnetic bearing. A triple seal structure for magnetic fluid which includes a first fluid seal constituted by the seals of the bearing unit, a second fluid seal constituted by a magnet of the rotor and a third fluid seal constituted by a magnet of the seal magnet is provided in the motor.

13 Claims, 6 Drawing Sheets

SEALED MAGNETIC FLUID BEARING FOR POLYGON MIRROR DRIVE MOTOR

This is a continuation of application Ser. No. 07/692,662, filed Apr. 29, 1991 now U.S. Pat. No. 5,325,006.

BACKGROUND OF THE INVENTION

1. Field of the Invention

The present invention relates to a motor or a polygon mirror drive motor which drives a polygon mirror for beam scanning, and more particularly, to a motor provided with a magnetic fluid bearing.

2. Description of the Prior Art

In high speed motor such as a beam scanning polygon mirror motor of a laser beam printer, it has conventionally been necessary to support a rotary body by a bearing of small friction loss for the purpose of realizing high speed rotation with low vibration, and it has been customary to bear loads in the radial direction by a dynamic pressure pneumatic bearing and loads in the thrust direction by a magnetic bearing.

For example, Japanese Patent Unexamined Publication No. 61-157820 discloses a dynamic pressure radial bearing between a rotor and a frame body and, in order to quickly suppress vibration caused in the rotor due to a disturbance, a closed air chamber and the open air are communicated with each other through a small hole.

In the above prior art, vibration due to disturbance is suppressed by forming the small hole in the closed air chamber so as to accelerate the damping of vibration or by preventing collision of metallic members by using a damper. However, this measure is mainly intended for the vibration in the thrust direction during the operation and the disturbance in the radial direction and contact of the radial bearing at the time of starting and stopping are not taken into consideration, resulting in a possibility that powder produced by abrasion due to contact in the bearing portion damages the mirror or bearing seizure occurs.

Further, in order to realize the high speed rotation with low vibration and less irregularity of rotation, it is essential to improve the dimensional accuracy of manufactured parts such as shaft and bearing individually, but this is not sufficient alone.

In other words, it has been often experienced from the standpoint of, engineer that, however, high the dimensional accuracy of each individual part may be improved, change of the ambient temperature or the like will adversely affect the combined accuracy of the individual parts, thereby resulting in a generation considerable vibrations.

SUMMARY OF THE INVENTION

Object

In view of the above points, a primary object of the present invention is to provide a motor which is capable of withstanding highly frequent starting and stopping and of rotating at high speed stably with less vibration.

A second object of the present invention is to provide a high speed motor which rotates with less vibration and low irregularity of rotation and which is free of imbalance in a rotor of a pneumatic bearing motor and a service life similar to a ball bearing motor is achieved.

A third object of the present invention is to provide a motor which rotates with less vibration and irregularity of rotation by reducing the pressure of bearing portion.

Summary

The primary object can be achieved by (a) using a magnetic medium as the fluid of a fluid bearing unit having an opening at one end thereof and providing a first seal in the opening so as to prevent leakage of the fluid.

(b) forming a second seal by inserting in the bearing unit a cut rotor which has a motor magnet attached on the other side thereof, a polygon mirror attached at the top thereof, and a rotor magnet of a seal magnet disposed between the motor magnet and polygon mirror, and (c) arranging a stator of the motor oppositely to the motor magnet and forming a third magnetic fluid seal using a stator magnet of a seal magnet disposed oppositely to the rotor magnet of the seal magnet.

Further, the motor magnet and the rotor magnet of a seal magnet are united in the form of a double cylinder with the motor magnet being oriented in the radial direction and the seal magnet magnet being oriented in the thrust direction, and then combined with the support member of the magnet by insert molding.

Moreover, a second object of the invention can be achieved by the arrangements that radial loads are carried by a static pressure type radial fluid bearing and thrust loads are born by a seal magnet, and component parts of the rotor section are fastened by shrinkage fit for the purpose of preventing any vibration from being caused due to distortion of the rotor during the operation.

In addition, improvement of the ON-OFF lifetime can be achieved by the arrangements that a magnetic fluid of a higher viscosity than air is sealed and outflow of the magnetic fluid is prevented by seals.

DETAILED DESCRIPTION OF THE INVENTION

Description will be given below of preferred embodiments of the present invention with reference to the drawings.

Figure 1:
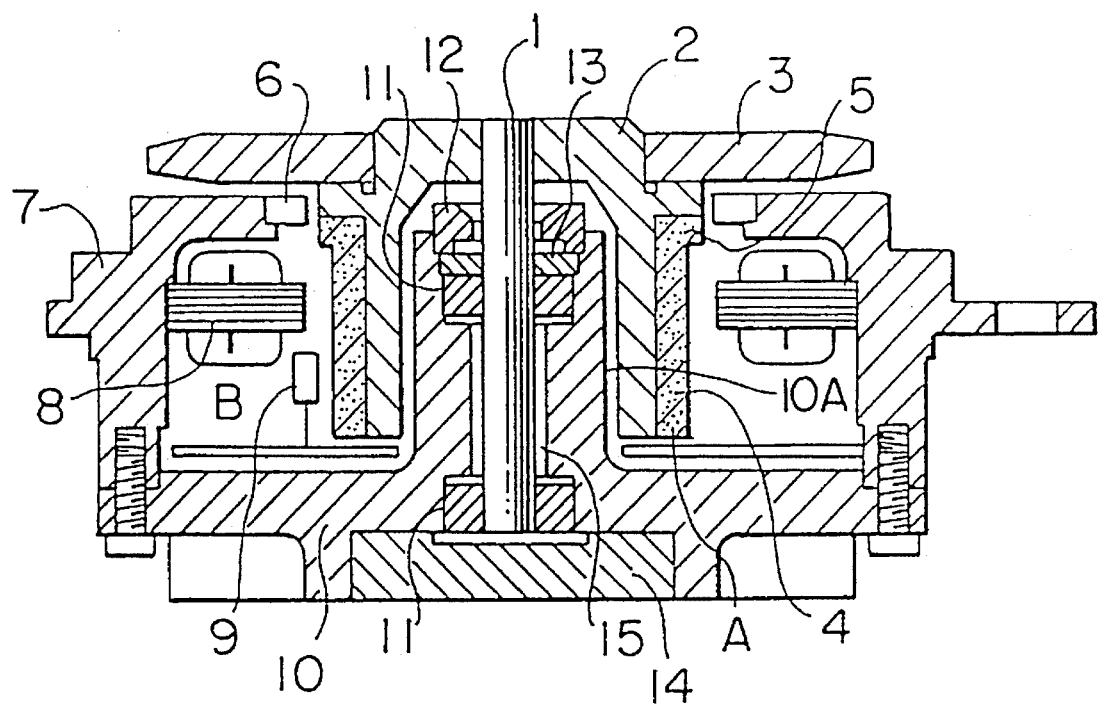
FIG. 1 is a vertical sectional view of an inner rotor type motor.

FIG. 1 shows an embodiment that utilizes an inner rotor type motor. A shaft 1 and a support member 2 are fixed to each other by shrinkage fit, and a motor magnet 4 and a rotor magnet 5 of a seal magnet are formed by insert molding on the outer periphery of a cylindrical portion of the support member, and a polygon mirror 3 is attached to the top portion of the support member, thus forming a cup rotor unit.

Stator coils 8 are attached to a housing 7, a stator magnet of a seal magnet 6 is set at one of open ends of the housing, and a position detecting element 9 is arranged at the other open end of the housing in such a manner as to face the lower part of the motor magnet 4, thus forming a stator unit.

An end bracket 10 is formed with a cylindrical portion 10A in which bearings to be described later and a magnetic fluid are to be inserted and filled. Radial bearings 11 are set in both opening portions of the cylindrical portion 10A, a dynamic pressure seal 12 and a magnetic seal 13 are set at an opening end at the top, and a cover 14 is attached to the other opening end at the bottom. A magnetic fluid 15 is then charged to thereby form a magnetic fluid bearing unit.

Thereafter, the magnetic fluid bearing unit is fixed to the stator unit, and a shaft of the cup rotor unit is inserted through the opening end of this assembly, thereby forming a polygon mirror motor.

Figure 2:
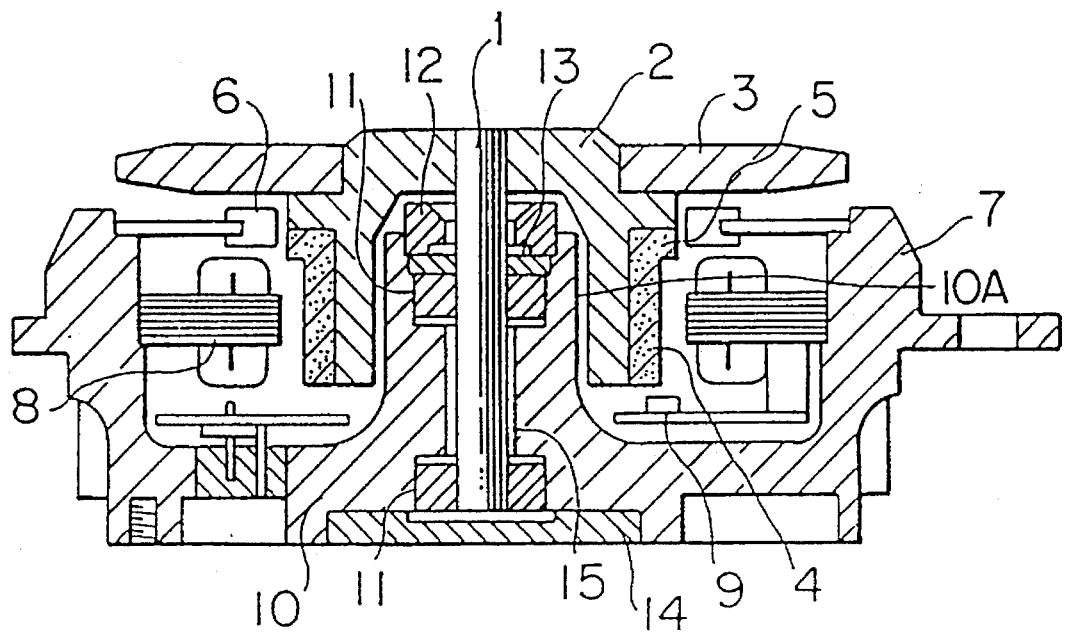
FIG. 2 is a vertical sectional view of another inner rotor type motor in which a stator unit and a bearing unit are unified.

FIG. 2 shows a modification of the polygon mirror motor having the structure shown in FIG. 1, in which the stator unit and the magnetic fluid bearing unit are unified for the convenience of mass production.

Operation of the present invention will be described below.

As the shaft 1 of the cut rotor unit is inserted into the fluid bearing unit, the rotor magnet 5 and stator magnet 6 of the seal magnet which are magnetized to have opposite polarities in the thrust direction are brought into the attracted state. This attractive force in the thrust direction, if it is set to be greater than the dead load of the cup rotor unit, can make the seal magnetic bearing float in the magnetic fluid of the fluid bearing unit even if the seal magnet reaches a high temperature during the operation of the motor.

Therefore, upon the application of the driving force to the cup rotor unit, the shaft 1 and the radial bearings 11 rotate smoothly without causing any contact owing to high rigidity of the fluid. Then, as the number of revolutions is increased gradually, vibration is increased due to residual unbalance in the cup rotor unit, and however, the shaft 1 and the radial bearings 11 can be prevented from coming in contact with each other so far as the out of roundness in both parts is set at about 1 to 2 μm.

However, if a clearance between the shaft 1 and the radial bearings 11 is large, the cup rotor unit suffers the precession to increase the inclination of surface of the laser beam reflector of the polygon mirror 3, resulting in the picture of uneven quality at the time of actual use and, hence, incapacity for use as a laser scanner of the laser beam printer. Consequently, the above clearance is designed to be about 3 to 5 μm.

In case that the posture is maintained vertical during the operation of the motor, there arises no problem in terms of vibration, and however, vibration of the shaft 1 causes the magnetic fluid 15 to come up along the shaft 1 to flow to the inside of the support member 2 or to be changed into vapor due to high temperature during the operation. To prevent this phenomenon, the magnetic seal 13 serves to hold the magnetic fluid 15 which is coming up and the dynamic pressure seal 12 serves to push back the magnetic fluid 15 downwards as viewed in the drawing as well as to reduce the evaporative area, thereby to prolong the lubrication lifetime of the radial bearings 11 and suppress the increase of the bearing loss attributable to the increase of viscosity.

If the magnetic fluid 15 should flow out of the fluid bearing unit to stick to the inside of the support member 2, it would go down by gravity and move radially by centrifugal force so as to stick to a portion A constituting the lower end portion of the magnet 4 which serves as a second seal. Part of the magnetic fluid 15 which overflows the portion A is scattered to a portion B in the motor by the centrifugal force. When the magnetic fluid thus scattered to the portion B in the motor and changed into vapor will go outside the motor, it is caught by the stator magnet 6 of the seal magnet which serves as a third seal so that it is prevented from being scattered toward the polygon mirror 3. Therefore, the present invention provides a motor having a triple seal structure.

Figure 3:
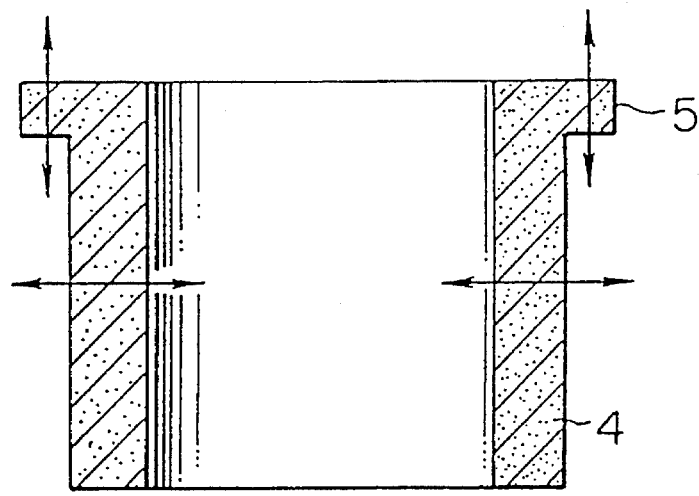
FIG. 3 is a structural view of a motor magnet.

FIG. 3 illustrates a motor magnet 4 and a rotor magnet 5 of a seal magnet which are formed as a unit body.

The motor magnet 4 is magnetized to have a radial magnetic field pattern so as to obtain a strong magnetic field in the radial direction. The rotor magnet 5 of the seal magnet 5 which is magnetized to be oriented in the thrust direction is in the form of a coaxial triple cylinder and the outside diameter of the thrust oriented portion of the magnet is made larger than the outside diameter of the radial oriented portion of the magnet. It is noted that arrows indicate the directions of magnetic field orientation.

Then, the support member 2 is formed by insert molding. This makes it possible to reduce the assembling time and initial error (unbalance) of the rotor unit and to reduce the time required for the unbalance correction in the succeeding process. It was experimentally determined that the initial error concerned was about 2 to 5 mg-cm.

The magnets 5, 6 of the seal magnet may be arranged at any position in the motor so far as they serve only to float the rotor unit; however, from the viewpoint of sealing of the magnetic fluid 15, supporting of the rotor unit and suppression of radial vibration, the magnets 5, 6 are arranged beyond the sphere of the radial bearings 11 with an increased coaxial accuracy so that the apparent bearing span is elongated, thereby assuring the further stabilization due to the radial supporting force of the seal magnet.

Figure 4:
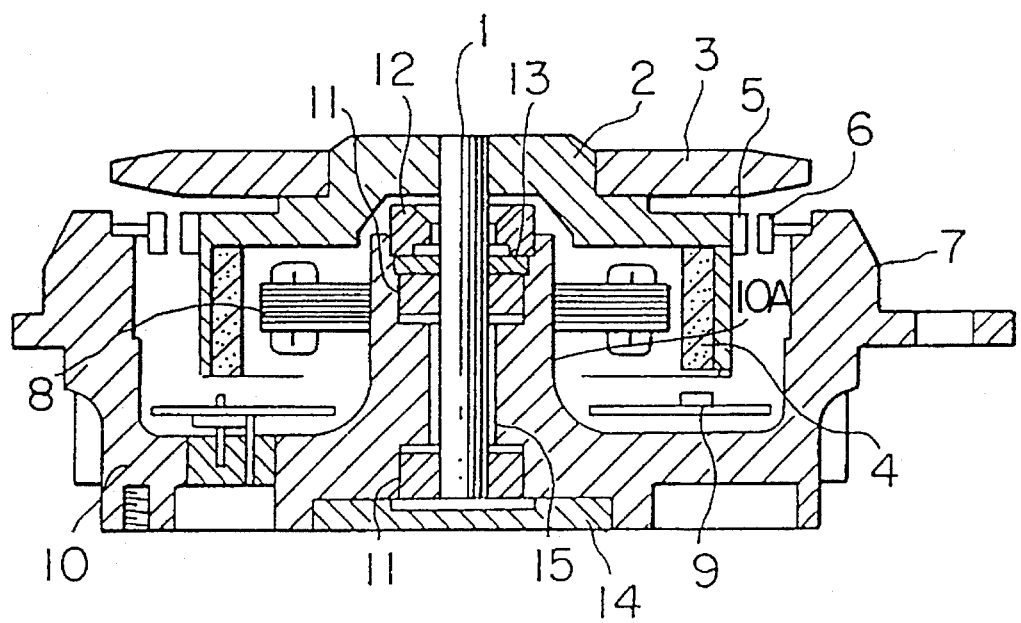
FIG. 4 is a vertical sectional view of an outer rotor type motor.

An outstanding feature of the outer rotor motor of FIG. 4 is that, since the powerful motor magnet 4 is located inside of the support member 2 and a powerful second seal is also achieved so that the magnetic fluid is prevented from going outside the cup rotor unit. However, even if the magnetic fluid could leak to the outside of the cup rotor unit, since a third seal is formed by the interaction between the rotor magnet 5 of seal magnet and the stator magnet 6 of the seal magnet, no leakage takes place; therefore, the polygon mirror can be prevented from being stained.

Figure 5:
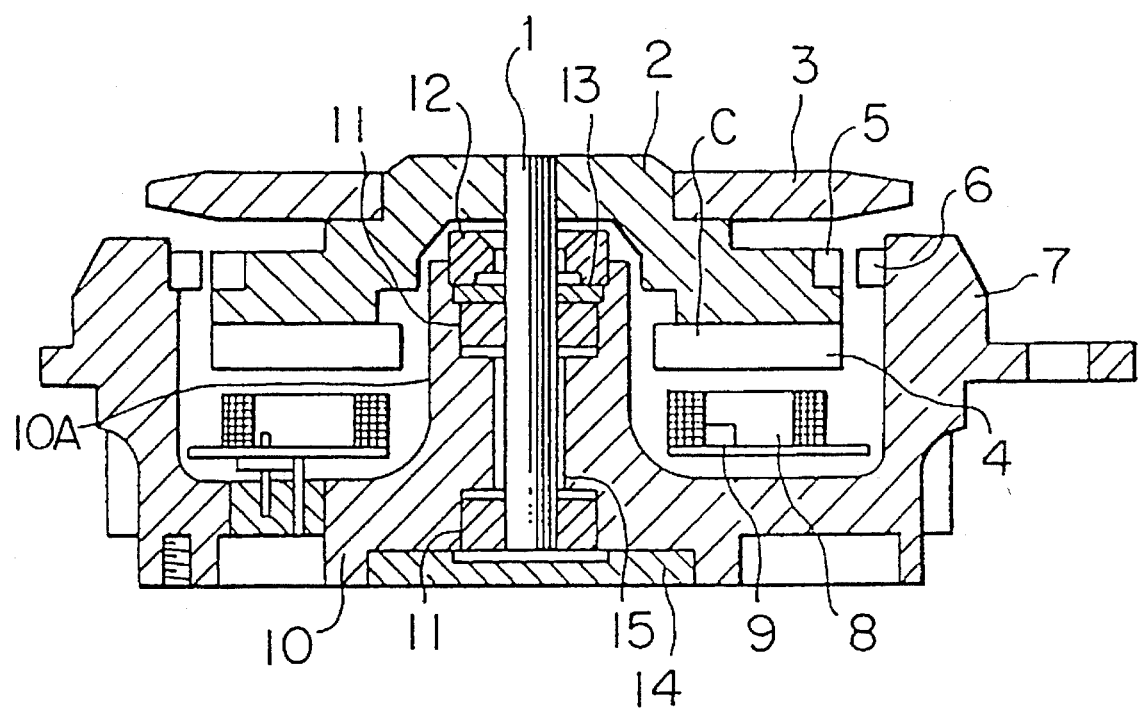
FIG. 5 is a vertical sectional view of a surface opposed type motor.

In a surface opposed motor of FIG. 5, the magnetic fluid almost sticks to a portion C of the motor magnet 4 so that it is nearly prevented from leaking to the outside of the rotor unit. However, in this case as well, leakage of vapor is further prevented by the magnets 5, 6 in the same manner as described in connection with FIG. 4.

By utilizing a magnetic fluid as the fluid of the fluid bearing, the rigidity of the bearing is improved. As a result, the rotor is well balanced, so that the rotor shaft in the fluid is prevented from contacting metallic portions of the radial bearings therefore, the shaft and the bearings are free of abrasion even if starting and stopping are repeated, thereby resulting in an ON-OFF service life of the motor being extended.

Further, since a lubricating oil used as the base of the magnetic fluid has a far higher viscosity than air, the rotor is hardly vibrated due to disturbance and, if the rotor is vibrated, vibration will be diminished quickly.

In order to maintain such an effect, a magnetic seal provided by magnets and a dynamic pressure seal operative to push in the magnetic fluid to the inside of the fluid bearing when the motor rotates are set at the opening end of the magnetic fluid bearing, so that the magnetic fluid can be prevented from leaking out when the motor is, for example reversed.

In addition, in case of leakage, the magnetic fluid going out along the inner side of the cup rotor is made to stick to the rotor magnet which serves as the second seal.

The magnetic fluid passed even through the second seal is attracted to stick to the stationary part, in particular, of the seal magnet which serves as the third seal. In this way, the magnetic fluid is prevented from adhering to the polygon mirror motor to reduce the reflecting power of the laser beam owing to the triple seal structure.

Moreover, since the seal magnet is arranged in the vicinity of the center of gravity of the rotor, it supports naturally the dead load of the rotor in the thrust direction and generates supporting forces in the radial direction as well, thereby suppressing the radial vibration.

Figure 6:
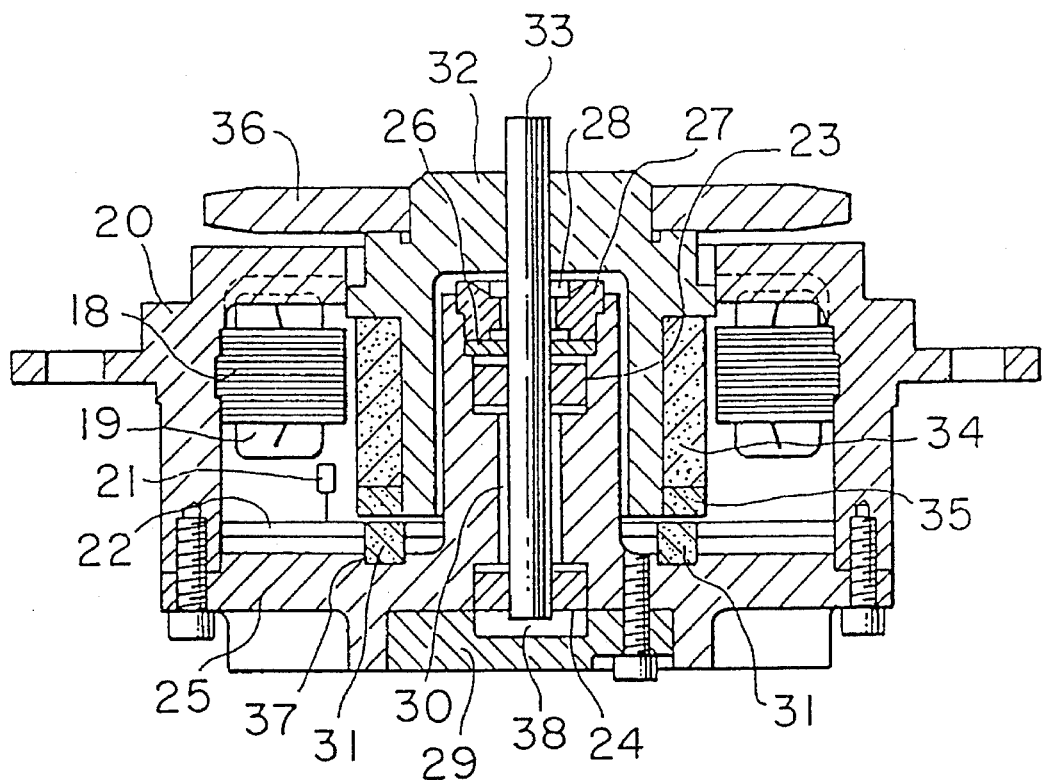
FIG. 6 is a vertical sectional view of another embodiment of the present invention.
Figure 7:
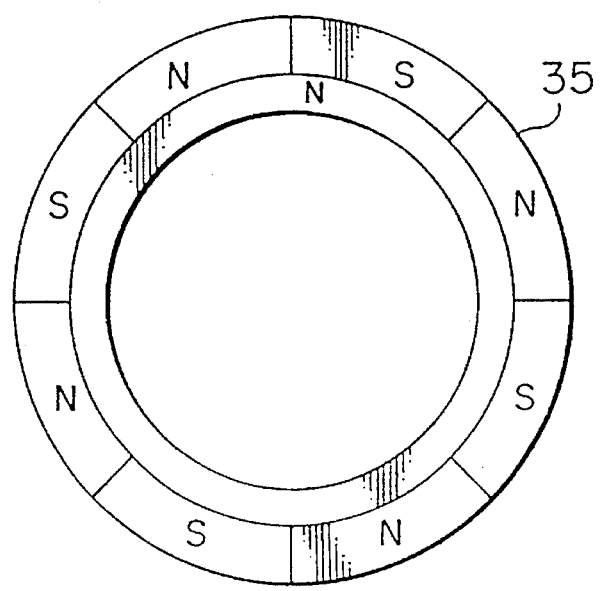
FIG. 7 is a bottom view showing a magnetization pattern of a revolution detecting magnet used in the embodiment shown in FIG. 6.

As shown in FIG. 6, driving coils 19 wound on iron cores 18 are attached to a housing 20 so as to form a driving coil unit. A position detecting sensor 21 and a printed board 22 printed with a revolution detecting coil pattern are provided and radial bearings 23, 24 are fixed to a bearing support member 25, with a dynamic pressure seal 27 being arranged on a side of an air pocket 26. A magnetic seal 28 is arranged on the outer side of the dynamic pressure seal 27, with a being cover 29 bearing attached to close an opening end opposite to these seals. A prescribed quantity of magnetic fluid 30 is poured into the bearing portion, thus forming a seal combination type magnetic fluid bearing.

In addition, a magnetic thrust bearing magnet 31 is arranged on the bearing support member 25 in such a manner so as to be opposed to a revolution detecting magnet and is set at one opening end of the above driving coil unit, thereby forming the stator section of the motor.

Subsequently, a collar 32 is shrinkage fitted on a shaft 33, a motor magnet 34 and a revolution detecting magnet 35 are shrinkage fitted thereon. A polygon mirror 36 is shrinkage fitted on the collar 32, thereby forming the rotor section of the motor.

Then, the rotor section of the motor is inserted into the seal combination type magnetic fluid bearing in the stator section of the motor, thereby forming a polygon mirror motor.

As shown in FIG. 6, in the seal combination type bearing, radial loads are carried by the radial bearings 23, 24, and thrust loads are carried in such a manner that the revolution detecting magnet 35, having a magnetization pattern in which a multipolar magnetized portion for revolution detecting, is located on the outer side and a magnetized portion, serving as the repulsion pole of the magnetic thrust bearing, is located on the inner side and is shrinkage fitted on the collar 32 so as to provide one of magnetic thrust bearing poles.

The magnetic thrust bearing magnet 31, serving as the pair to the above pole, is fixed by bonding to a setting groove 37 formed in the bearing support member 25.

Then, the repulsion surface of the magnetic thrust bearing magnet 31 is substantially flush with the detecting coil pattern surface of the printed board 22.

Since the gap in the thrust direction can be adjusted in accordance with the intensity of the magnet of the seal magnet, the gap between the revolution detecting magnet 35 and the printed board 22 can be maintained properly and uniformly and the revolution detecting voltage is maintained nearly constant as well, thereby resulting in the construction of high electrical and mechanical reliability.

It goes without saying that the end face of the shaft 33 of the rotor section is always maintained out of contact with the bearing cover 29 as shown in FIG. 6. Therefore, vibration and loss are reduced as well as no precision parts are needed in the thrust direction of the bearing. This contributes to reduction in production cost.

Reference numeral 38 denotes a thrust space existing at the lower end portion of the shaft.

Further, by bonding the printed board 22 and the magnetic thrust bearing magnet 31, it is possible to prevent dust from rising from the end face of the printed board, thereby making it possible to prevent the polygon mirror 36 from being stained.

Moreover, it has been known and was confirmed experimentally that change in vibration during the operation is attributable to the change in unbalance of the rotor section. Therefore, in order to prevent constituent parts of the rotor section from being displaced in the radial direction, the aluminum collar 32, having a high coefficient of thermal expansion, is shrinkage fitted or warm fitted by heating on the shaft 33 of SUS having a small diameter so as to prevent any deviation from concentricity at the time of change in the temperature. The collar 32 and the polygon mirror 36 are made of materials the physical properties of which are substantially equal to each other for the purpose of restraining the angle of reflection of the laser beam from being abruptly changed due to deformation of the mirror surface. Additionally, in order to prevent the accuracy of fitting resulting in the deformation of the mirror surface, the collar 32 and the polygon mirror 36 are worked with out of roundness below 2 μm or so and subjected to shrinkage fit, thereby preventing the polygon mirror 36 from being displaced in the radial direction at the time of change in the temperature.

Fitting of the motor magnet 34 and revolution detecting magnet 35 on the collar 32 is performed by a shrinkage fit with the use of plastic magnets having a larger coefficient of thermal expansion than the collar 32, thereby preventing any radial displacement attributable to temperature change.

In order to reduce the loss due to viscosity, the fluid 30 used in the seal combination type magnetic fluid bearing is prepared by stirring a mixture of a metallic lubricating oil of low viscosity and fine ferromagnetic powder the particle size of which is less than 0.1 μm and which has a size and shape incapable of being precipitated in the liquid.

Consequently, since the fluid 30 is not a high viscosity lubricant such as ball bearing grease but a liquid lubricant, there is no possibility that the torque load of the bearing is changed abruptly by the rotation of the shaft and, further, the shaft is supported by the bearing through the oil film unlike a pneumatic bearing in which a shaft is maintained in direct contact with bearing constituting members when the motor is stopped. Accordingly, there is no possibility that the bearing and shaft are subject to abrasion during a turning ON and OFF to increase the clearance and, hence to increase the rotational vibration and irregularity of rotation, with the result that it is possible to continue smooth rotation.

In the manner described above, it is possible to provide a polygon mirror motor with a longer ON-OFF service time than that of a motor in which a pneumatic bearing is used.

The fluid bearing serving as means for reducing vibration and irregularity of rotation utilizes a fluid which contains a similar substance to a lubricating oil as its main ingredient, so that a film far stronger than air is formed between the bearing and the shaft. Consequently, there are no possibilities that the bearing and the shaft is come into metallic contact with each other due to vibration of a main body as is the case of a pneumatic bearing, and that the torque loss is changed abruptly due to change of the rolling surface and tumbling of the grease as in the case of the ball bearing. As a result, the fluid bearing can operate in such a manner that as the viscosity of the fluid is changed gradually in accordance with the temperature change, with the torque loss of the bearing also being changed gradually.

For example, concerning the polygon mirror motor of 15000 rpm, the period of one revolution is 4 mSEC and, hence, the change of number of revolutions is in the order of mSEC. However, the change of viscosity of the fluid due to self-heating takes place in seconds or minutes, which change falls in the range in which the number of revolutions can be controlled sufficiently by a controller. As a result, there is no possibility that the irregularity of rotation deteriorates.

However, if the end face of the shaft comes into contact with the stator section due to its own weight, a seizure will occur. In order to prevent this phenomenon, a thrust bearing is provided; however, vibration occurs which is proportional to the accuracy since the thrust bearing is a contact type bearing.

To cope with this, the revolution detecting magnet is given both the revolution detecting magnetization pattern and the magnetic thrust bearing use magnetization pattern as in the prior art, and is arranged in the rotor section so as to be opposed to a magnet of a repulsion magnetic thrust bearing disposed in the stator section. As a result, the rotor constantly floats, so that the vibration, noise and bearing loss can be reduced.

The change of vibration during the operation is attributable to the increase of the unbalance of the rotary body which results from the change of the concentricly of the mirror and the shaft which are fixed to each other by spring or bonding due to a temperature increase or from the change of the concentricity of the magnet and the shaft bonded to each other due to temperature rise.

To cope with this, by fixing the mirror and the magnet to the shaft by a shrinkage fit, there is no possibility that the mirror and the magnet are displaced due to temperature rise and centrifugal force during the use. As a result, there is no change in the unbalance during the operation so that the change of vibration can be reduced.

The liquid bearing used as means for improving the ON-OFF service life is far greater in the film strength as compared with the pneumatic bearing, and therefore, the radial bearing and the shaft can be prevented from coming into metallic contact with each other both at the time of starting and during the operation.

As a result, since the bearing and the shaft are free from abrasion, the clearance between the bearing and the shaft is never increased and, hence, there is no increase in the inclination of the surface of the polygon mirror nor an increase in the vibration.

Figure 8:
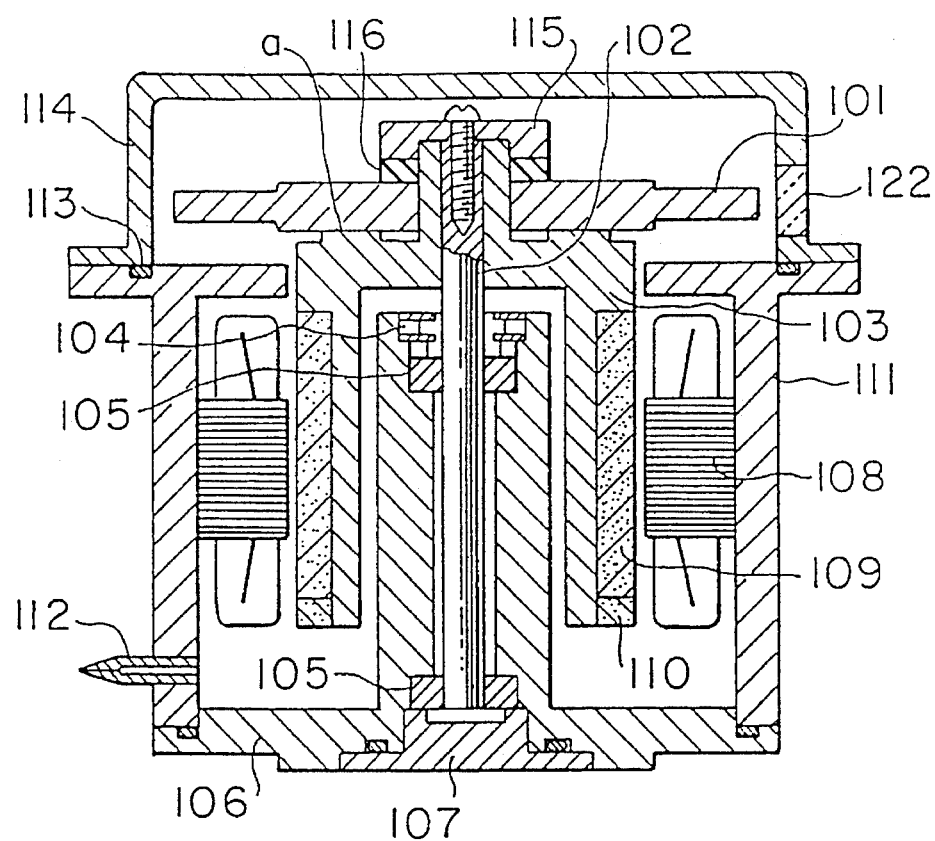
FIG. 8 is a vertical sectional view of a scanner motor according to the present invention.

As shown in FIG. 8, a rotary polygon mirror 101 is pressed lightly against a rotor 103 by a stud 115 through an elastic member 116 so as to be mounted thereon. A shaft 102 is press fitted in the center of the rotor 103 and is rotatably supported by bearings 105 built in a bearing case 106. A magnetic fluid seal 104 prevents the lubricating oil of the bearing 105 from being scattered. The rotor 103 is driven by a motor rotor 109 constituted by a permanent magnet fixed to the rotor 103 and an armature 108 arranged around the motor rotor 109 oppositely thereto for serving to generate the magnetic field. The number of revolutions of the rotor 103 is controlled in accordance with the magnetic flux change in a multipolar magnet ring 110 using a hole effect device (not shown). The scanner motor having the above construction is in the form of a closed chamber which is defined by a motor case 111, a mirror cover 114 and the bearing case 106, and is sealed up after air is exhausted from the interior of the chamber through a sealing pipe 112 by the action of a vacuum pump (not shown) to reduce the pressure to a suitable level.

In operation, the laser beam is made to be incident through a panel 122 which is made of a flat glass sheet for the purpose of permitting incident and reflected laser beam to go straight on therethrough. Further, as for the elastic member 116 used in mounting the rotary polygon mirror 101 for serving to prevent the mirror from being deformed, a leaf spring can be used.

With the scanner motor conducted as described above, the temperature of the rotor 103 increases due to heat generated at the time of high speed rotation, so that heat is transferred from a mounting surface a to the rotary polygon mirror 101 so as to heat the latter. Since air is rarefied due to pressure reduction within the motor, the rotary polygon mirror 101 cannot clean itself by rotation as in the conventional scanner motor, resulting in a substantially uniform temperature distribution. This means that radiation cooling dominates in an environment of reduced pressure, so that the cooling effect is less as compared with the radiation in the atmospheric condition, and therefore, the constituent parts attain the uniform temperature. Consequently, since the distribution of temperature of the rotary polygon mirror 101 is uniform, there is no heat distortion as in conventional constructions. Further, since the motor is rotated with the pressure of its interior being reduced, there is no windage loss due to rotary parts and, hence, the motor consumes very little electricity, and since the loss of electricity of the motor is reduced in the environment of reduced pressure even if the radiation is insufficient, the temperature of the rotor 103 is not raised so high. In addition, since the fluid resistance exerted on the rotary polygon mirror is negligible in the environment of reduced pressure, there is no unstable vibration attributable to the force of fluid. As a result, it is possible to maintain the stable rotation without using the bearing of so high rigidity as the bearings 105 which support the shaft 102.

Figure 9:
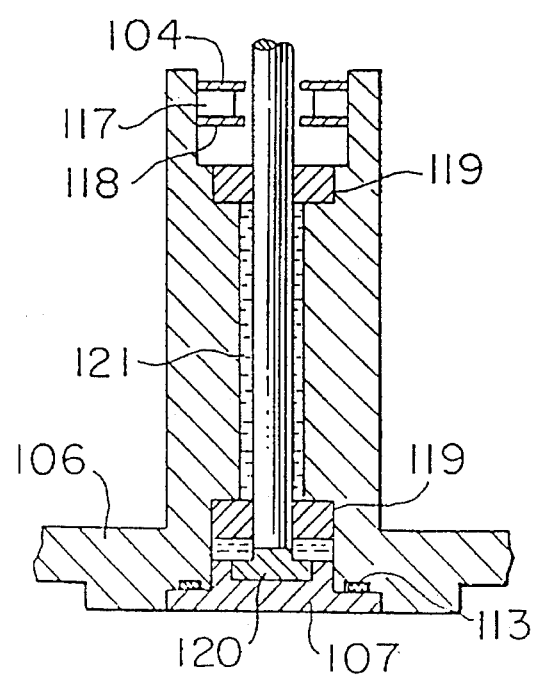
FIG. 9 is a vertical sectional view of a bearing device.

FIG. 9 shows an example of the bearing unit. A magnetic fluid seal 104 constituted by a permanent magnet 117 and pole pieces 108, radial bearings 119 and a thrust bearing 120 fitted in a bearing retainer 107 are incorporated in the bearing case 106 so that the shaft 102 is supported rotatably. A magnetic fluid 121 is used as the lubricant of the bearings 119 so that, even if the magnetic fluid 121 is scattered due to rotation of the shaft 102, the magnetic fluid 121 is caught by the magnetic fluid seal 104 so as not to stain the outside. Further, the pneumatic bearing used in the conventional scanner motor is a dynamic pressure group bearing having a diameter of about 15 mm; however, since no unbalanced force is exerted on the rotary polygon mirror due to stirring of the fluid in the reduced pressure environment, it is possible to use a cylindrical bearing having a diameter of about 4 mm, resulting in attainment of inexpensive bearing device and compact scanner motor.

Such scanner motor may be subjected to pressure reduction and sealing one by one, and a large number of mass-produced motors each assembled as shown in FIG. 8 are put in an evacuated closed container to be subjected to the pressure reduction by using the vacuum pump and, then, the tip end of each sealing pipe 12 is closed so as to maintain the interior of the motor airtight. Sealing device for the sealing pipe 12 is attached to the evacuated closed container so as to be operated to seal the pipe after the pressure is reduced to a suitable level.

Figure 10:
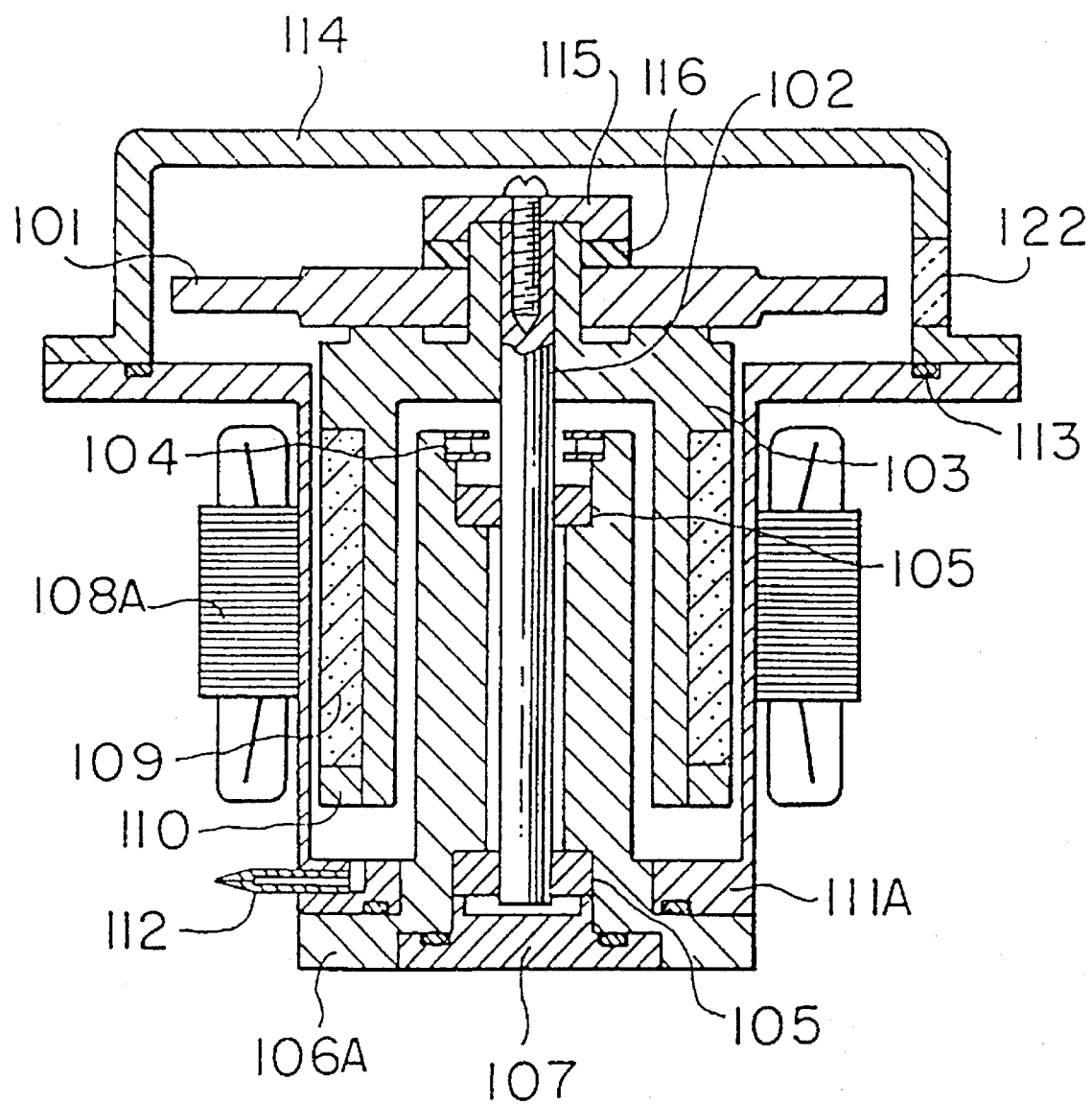
FIG. 10 is a vertical sectional view of a modification of the scanner motor shown in FIG. 8.

FIG. 10 shows another embodiment equivalent to that shown in FIG. 8. As the speed of rotation of the motor becomes higher, the iron loss of an armature core 108A is remarkably increased remarkably to increase the temperature of the motor. For this reason, in the construction shown in FIG. 10, the armature 108A is arranged around the motor case 111A so as to cause the heat generated by the armature 108A radiate directly into the atmosphere. This arrangement makes the gap between the armature 108A and rotor 109 of the motor large to reduce the driving force of the motor, and, at the time of rated rotation, the rotation can continue with the driving force corresponding to the friction loss (several watts) of the bearings. Consequently, the motor of this embodiment can achieve the same functions and effects as those of the scanner motor shown in FIG. 8 except that the starting time is increased.

Furthermore, in such scanner motor of the invention, there is caused no deterioration of the accuracy of rotation attributable to the thermal factor as described above and, in addition, the rotary polygon mirror is hardly effected by the fluid force; therefore, it is possible to achieve the rotation with high accuracy, with the result that high speed printing and highly fine picture can be obtained in the laser beam printer using the scanner motor of the present invention.

We claim:

1. A polygon mirror motor including a stator, a rotor, stator coils and radial bearings provided on said stator, said rotor including a rotor shaft, a collar provided on said rotor shaft, and a motor magnet and a polygon mirror provided on said collar, said motor magnet and said stator coils being disposed to face each other, said radial bearings being slide bearings and rotatably supporting said rotor shaft, and wherein a magnetic fluid is applied as a lubricating oil for lubricating sliding surfaces between said radial bearings and said rotor shaft, and said motor further including a magnetic fluid seal in the form of a permanent magnet which is disposed to surround the outer periphery of said rotor shaft, and wherein said collar is formed of a material having a greater coefficient of thermal expansion than that of said rotor shaft with said collar being joined to said rotor shaft by heat shrinkage fit, and said rotor further comprising a magnetic thrust bearing for restricting movements of said rotor in a thrust direction, said magnetic thrust bearing comprising a stator thrust magnet and a rotor thrust magnet, said stator thrust magnet being provided on said stator and said rotor thrust magnet being provided on said rotor, and said stator thrust magnet and said rotor thrust magnetic being disposed to face each other, in a direction perpendicular to the axial direction of said rotor shaft, whereby said polygon mirror motor rotates during operation with relatively low vibration and relatively low irregularity of rotation.

2. A polygon mirror motor according to claim 1, wherein said motor magnet and said stator coils are disposed to face each other in a direction along the axial direction of said rotor shaft.

3. A polygon mirror motor according to claim 1, wherein said rotor thrust magnet is provided on the outer periphery of said rotor, and said stator thrust magnet provided on said stator is disposed such that the inner periphery of said stator thrust magnet faces the outer periphery of said rotor thrust magnet.

4. A polygon mirror motor according to claim 1, wherein said rotor thrust magnet and said stator thrust magnet are formed to be ring-shaped, and are disposed in a concentric relationship with said rotor shaft.

5. A polygon mirror motor according to claim 1, wherein said rotor shaft is formed of stainless steel and said collar is formed of aluminum or aluminum alloy, and wherein said polygon mirror is formed separately from said collar and is mounted and secured to said collar by means of fastener means.

6. A polygon mirror motor according to claim 1, wherein said slide bearings rotatably support said rotor shaft with a clearance of less than or equal to about 5 μm.

7. A polygon mirror motor including a stator, a rotor, stator coils and radial bearings provided on said stator, and rotor including a rotor shaft, a collar provided on said rotor shaft, and a motor magnet and a polygon mirror provided on said collar, said motor magnet and said stator coils being disposed to face each other, said radial bearings being slide bearings and rotatably supporting said rotor shaft, and wherein a magnetic fluid is applied as a lubricating oil for lubricating sliding surfaces between said radial bearings and said rotor shaft, and said motor further including a magnetic fluid seal in the form of a permanent magnet which is disposed to surround the outer periphery of said rotor shaft, and wherein said collar is formed of a material having a greater coefficient of thermal expansion than that of said rotor shaft and said motor magnet is formed of a material having a greater coefficient of thermal expansion than that of said collar with said collar joined to said rotor shaft by heat shrinkage fit and said motor magnet joined to said collar by heat shrinkage fit, and said rotor further comprising a magnetic thrust bearing for restricting movements of said rotor in a thrust direction, said magnetic thrust bearing comprising a stator thrust magnet and a rotor thrust magnet, said stator thrust magnet being provided on said stator, said rotor thrust magnet being provided on said rotor and said thrust magnets being disposed to face each other in a direction perpendicular to the axial direction of said rotor shaft, whereby said polygon mirror motor rotates during operation with relatively low vibration and relatively low irregularity of rotation as.

8. A polygon mirror motor according to claim 7, wherein said rotor shaft is formed of a stainless steel, said collar is formed of aluminum or aluminum alloy, and said motor magnet is a plastic magnet.

9. A polygon mirror motor according to claim 7, wherein a surface where said motor magnet is joined to said collar by heat shrinkage fit is disposed on the inner periphery of said motor magnet.

10. A polygon mirror motor according to claim 7, wherein said motor magnet is cylindrical-shaped, a surface where said motor magnet is joined to said collar by heat shrinkage fit is disposed on the inner periphery of said motor magnet, and the outer periphery of said motor magnet faces the inner periphery of said stator coils, and wherein said rotor thrust magnet is provided on the outer periphery of said rotor, and said stator thrust magnet provided on said stator is disposed such that the inner periphery of said stator thrust magnet faces the outer periphery of said rotor thrust magnet.

11. A polygon mirror motor according to claim 7, wherein said slide bearings rotatably support said rotor shaft with a clearance of less than or equal to about 5 μm.

12. A polygon mirror motor including a stator, a rotor, stator coils and radial bearings provided on said stator, said rotor including a rotor shaft, a collar provided on said rotor shaft, and a motor magnet provided on said collar, said motor magnet and said stator coils being disposed to face each other, said radial bearings being slide bearings and rotatably supporting said rotor shaft, and wherein a magnetic fluid is applied as a lubricating oil for lubricating sliding surfaces between said radial bearings and said rotor shaft, and said motor further including a magnetic fluid seal in the form of a permanent magnet which is disposed to surround the outer periphery of said rotor shaft, and wherein said collar is formed of a material having a greater coefficient of thermal expansion than that of said rotor shaft with said collar being joined to said rotor shaft by heat shrinkage fit, and said motor further comprising a magnetic thrust bearing for restricting movements of said rotor in a thrust direction, said magnetic thrust bearing comprising a stator thrust magnet and a rotor thrust magnet, said stator thrust magnet being provided on said stator, said rotor thrust magnet being provided on said rotor, and said thrust magnets being disposed to face each other in a direction perpendicular to the axial direction of said rotor shaft, whereby said polygon mirror motor rotates during operation with relatively low vibration and relatively low irregularity of rotation as.

13. A polygon mirror motor according to claim 12, wherein said slide bearings rotatably support said rotor shaft with a clearance of less than or equal to about 5 μm.

* * * * *